US006544606B1

(12) United States Patent
Pennington et al.

(10) Patent No.: US 6,544,606 B1
(45) Date of Patent: Apr. 8, 2003

(54) SYSTEMS AND METHODS FOR STORING FISSILE MATERIALS

(75) Inventors: Charles W. Pennington, Alpharetta, GA (US); Willington J. Lee, Marietta, GA (US)

(73) Assignee: NAC International, Norcross, GA (US)

( * ) Notice: Subject to any disclaimer, the term of this patent is extended or adjusted under 35 U.S.C. 154(b) by 0 days.

(21) Appl. No.: 09/570,980

(22) Filed: May 15, 2000

Related U.S. Application Data

(60) Provisional application No. 60/175,584, filed on Jan. 11, 2000.

(51) Int. Cl.[7] ................................................ B29D 22/00

(52) U.S. Cl. ...................... 428/34.1; 428/336; 428/457; 428/698; 250/506.1; 250/515; 376/252; 976/DIG. 1

(58) Field of Search ................................ 428/336, 457, 428/698; 250/506.1; 376/252; 976/DIG. 1–DIG. 445

(56) References Cited

U.S. PATENT DOCUMENTS 4,292,528 A * 9/1981 Shaffer et al. .............. 250/506
4,562,001 A * 12/1985 Vietzke et al. ........... 206/524.2
4,783,311 A * 11/1988 Ferrari ........................ 376/417
5,268,045 A 12/1993 Clare .......................... 148/518
5,334,847 A * 8/1994 Kronberg ................. 250/506.1
5,789,077 A 8/1998 Nakahama et al. ......... 428/336

* cited by examiner

*Primary Examiner*—Mark L. Bell
*Assistant Examiner*—Shalie Manlove
(74) *Attorney, Agent, or Firm*—Thomas, Kayden, Horstemeyer & Risley LLP

(57) ABSTRACT

A preferred embodiment may generally be construed as providing a method for storing fissile material, such as spent nuclear fuel (SNF), and includes the steps of: providing a storage container configured to receive the fissile material therein; and applying a coating to a surface of the storage container. Preferably, the coating is formed, at least in part, of a neutron-absorbing material and is adapted to reduce neutron multiplication and/or provide a shielding of the fissile material received within the storage container. Systems also are provided.

17 Claims, 2 Drawing Sheets

SYSTEMS AND METHODS FOR STORING FISSILE MATERIALS

CROSS-REFERENCE TO RELATED APPLICATIONS

This application is based on and claims priority to U.S. Provisional Application Ser. No. 60/175,584, filed on Jan. 11, 2000.

BACKGROUND OF THE INVENTION

1. Field of the Invention

The present invention generally relates to the storage of fissile materials and, in particular, to systems and methods for storing fissile materials that utilize coatings formed, at least in part, of neutron-absorbing materials.

2. Description of the Related Art

Fissile materials (materials capable of fissioning), although providing significant benefits, inherently suffer from problems associated with their storage, such as storage that is utilized after a useful life of the fissile material has expired. For instance, nuclear fuel discharged from fission reactors, referred to hereinafter as Spent Nuclear Fuel (SNF), typically is stored in deep pools filled with water, with the water being provided to dissipate heat and to attenuate gamma and neutron radiation generated by the SNF. As an alternative to storing SNF in water-filled pools ("wet storage"), "dry storage" techniques also have been utilized.

In a typical dry-storage application, the SNF is stored in a substantially horizontal or substantially vertical configuration within a protective vessel which, typically, includes a heavy-walled structure, and which typically is referred to as the "cask" or "overpack." Heretofore, such wet and dry-storage techniques of SNF have been widely viewed as commercially viable radioactive material storage options possessing characteristics for enabling economical long-term storage.

As is known, one of the most important aspects of storing SNF is the control of neutron multiplication so as to prevent a self-sustaining chain reaction within the stored SNF. Such a self-sustaining chain reaction is known as "achieving criticality" or becoming "critical." Controlling neutron multiplication within the SNF (a process commonly referred to as "criticality control") typically is accomplished by providing a material between and/or among individual SNF assemblies for absorbing thermalized neutrons and preventing the neutrons from causing fission events in the SNF. Such a material, commonly referred to as a "neutron absorber," "neutron-absorbing material" or "neutron poison," typically is mechanically fastened to or mixed with the material, i.e., metal, of the structures which form the boxes or other containers for holding the SNF assemblies.

Typically, neutron absorbers or poisons contain an isotope, such as Boron-10, that absorbs neutrons. These isotopes typically are provided as part of another chemical compound, such as boron carbide ($B_4C$), for example. The chemical compound, e.g., $B_4C$, usually is mixed with yet another material, e.g., a metal, such as aluminum, for example, and is formed into plates. The plates are then mechanically fastened to the structures containing the SNF. Another approach has been to mix the chemical compound with the material which forms the structures for containing the SNF, and then forming the structures with the combined material. As is known, utilization of either of these aforementioned approaches tends to provide an isotope for capturing thermalized neutrons that is significantly diluted by other materials, thereby reducing the potential effectiveness of the isotopes. Additionally, the procedures utilized for attaching the materials containing the poisons to, or mixing the chemical compound containing the poisons with, the structural material may involve undesirable material limitations and/or associated costs.

Therefore, there is a need for improved systems and methods which address these and other shortcomings of the prior art.

SUMMARY OF THE INVENTION

Briefly described, the present invention relates to the storage of fissile materials and, in some embodiments, to the storage of spent nuclear fuel (SNF). In a preferred embodiment, the present invention may generally be construed as providing a method for storing fissile materials and includes the steps of: providing a storage container configured to receive the fissile materials therein, and; applying a coating to a surface of the storage container. Preferably, the coating is formed, at least in part, of a neutron-absorbing material which may be adapted to reduce neutron multiplication of the fissile material received within the storage container.

An alternative method includes the steps of: providing a storage container configured to receive fissile material therein; applying a coating to a surface of the storage container, the coating being formed, at least in part, of a neutron-absorbing material; and arranging a neutron-thermalizing medium proximate to the coating so that the coating and the neutron-thermalizing medium cooperate to form a shielding about at least a portion of the fissile material received within the storage container.

In another embodiment, a system for storing SNF is provided. Preferably, the system includes a storage container configured to receive SNF therein, and a coating arranged proximate to a surface of the storage container, with the coating incorporating neutron-absorbing material.

In another embodiment, a system for storing SNF incorporates a storage container and means for absorbing neutrons arranged proximate to a surface of the storage container.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
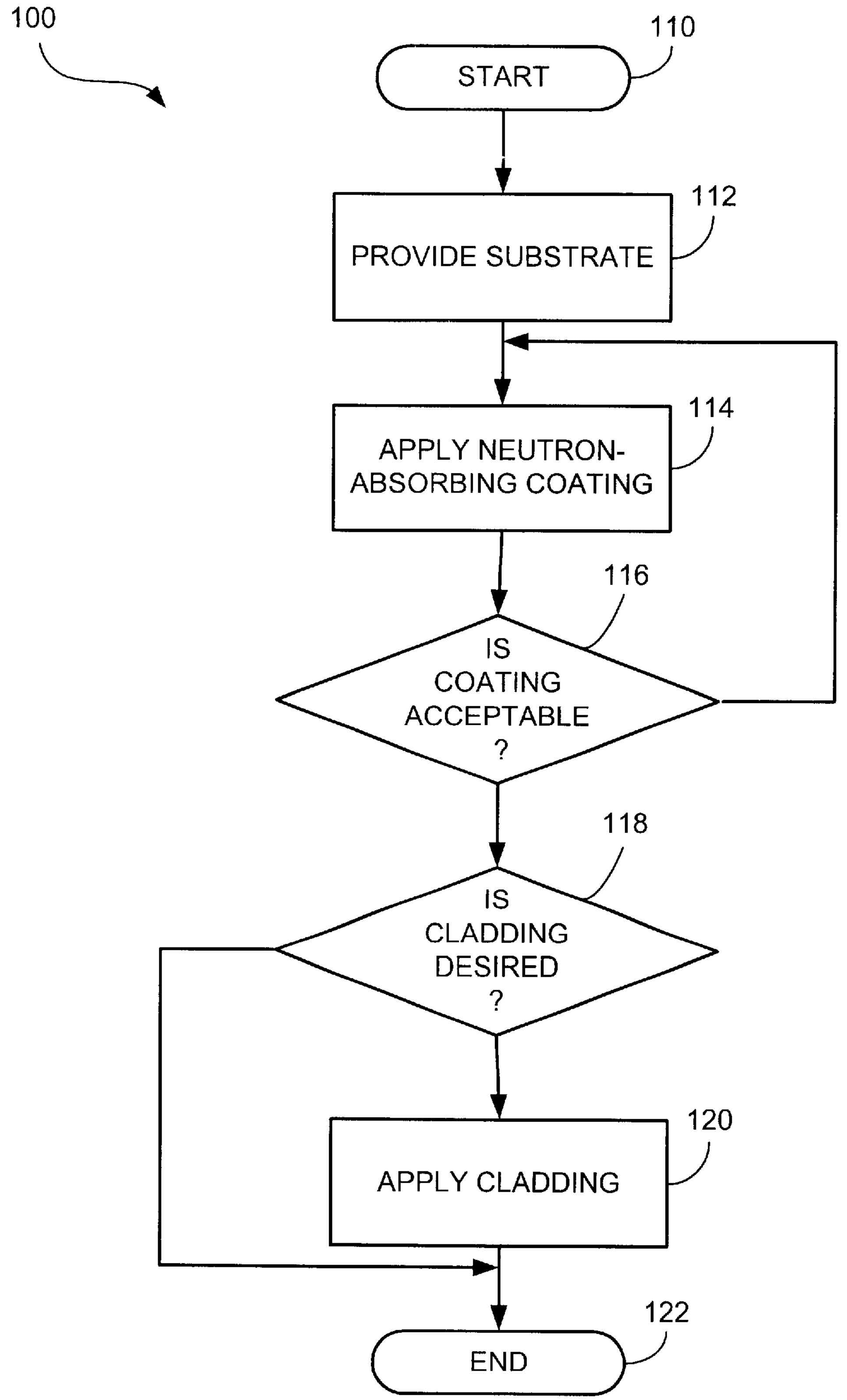
FIG. 1 is a flow diagram depiction a functional representation of a preferred embodiment of the present invention.

Reference will now be made in detail to the description of the invention as illustrated in the drawings with like numerals indicating like parts throughout the several views. As described in detailed hereinafter, the present invention provides systems and methods for storing fissile material, such as spent nuclear fuel (SNE), among others. Although the present invention will be described herein in relation to the storage of SNF, it should be noted that applications of the teachings of the present invention are not so limited. In particular, the present invention may be utilized in storage applications relating to fissile materials, including radioactive-fissile materials which may be naturally radioactive and/or radioactive due to the occurrence of a fission event(s).

Referring now to FIG. 1, a flow diagram depicting a preferred method 100 of the present invention is provided. As shown therein, the method preferable begins at block 110 and proceeds to block 112 where an appropriate substrate is provided. Such a substrate may be provided in the form of various containers and/or container inserts which are adapted for the storage of fissile materials, such as SNF. These containers and/or container inserts, as is known, may be adapted for providing accident control, e.g., providing structural integrity of the container and/or container insert, by utilizing structural components, and criticality control, e.g., absorbing thermalized neutrons, by utilizing criticality control materials (neutron-absorbing materials or neutron poisons). Thus, the substrate referred to in block 112 may include structural and/or criticality control components utilized in storage containers and/or container inserts.

Proceeding to block 114, a neutron-absorbing coating is applied to at least one surface of the provided substrate, as described in detailed hereinafter. As referred to herein, a "neutron-absorbing coating" is defined as a coating of, or a coating which includes, a neutron-absorbing material. Thereafter, such as in block 116, a determination is made as to whether the applied coating possesses desired characteristics, such as appropriate thickness, for example. If it is determined that the coating does not possess the desired characteristics, such as the coating has not yet achieved the desired thickness, the process may return to block 114. If, however, it is determined that the coating possesses the desired characteristics, the process may proceed to block 118 where a determination is made as to whether a protective cladding is desired. Such a protective cladding, described in detail hereinafter, may be applied (block 120) so that the neutron-absorbing coating is disposed between the protective cladding and the substrate, thereby providing improved survivability to the neutron-absorbing coating. If, however, it is determined that a protective cladding is not desired, the process may end at block 122, as also is the case after the protective cladding is applied, as required, in block 120.

As mentioned hereinbefore in regard to method 100 depicted in FIG. 1, the present invention includes the application of neutron-absorbing materials in the form of a coating(s) to a substrate. Such a neutron-absorbing material may include one or more elements or compounds containing desired neutron-absorbing characteristics while, at the same time, providing suitable properties of adhesion when applied as a coating. Examples of representative neutron-absorbing elements contained in materials include, but are not limited to: boron, hafnium, cadmium, gadolinium, silver, cobalt, samarium, iron and indium, among others. Thus, while in a particular application, a particular neutron-absorbing material may be utilized as a coating possessing a particular thickness, another neutron-absorbing material may be more appropriate for use when a coating of a different thickness is desired. Selection of an appropriate neutron-absorbing material and a corresponding thickness, however, is considered to be well within the skill of one of ordinary skill in the art. For ease of description, and not for purposes of limitation, the description of the present invention herein is provided in regard to the utilization of boron carbide ($B_4C$) as a neutron-absorbing material; however, other neutron-absorbing materials and their application as coatings are considered well within the scope of the present invention.

Although neutron-absorbing materials may be applied to the aforementioned substrates in any suitable manner which results in a proper adhesion of the neutron-absorbing material to the substrate, it has been determined that application of the neutron-absorbing material through the use of thermal spray-coating techniques provide suitable results. Such thermal spray-coating techniques typically are utilized in applications where materials are subjected to high-threat environments, such as where temperatures, physical contact, and chemical interaction, for example, may degrade a material of the surface coating and/or the substrate to which the surface coating is applied.

As utilized herein, the term "thermal spray-coating techniques" generally refers to a group of processes for depositing metallic material, non-metallic material and combinations thereof as coatings upon substrates. These processes, which are sometimes referred to as "metalizing," include Flame Spray (powder and wire), Plasma-Arc Spray (vacuum and atmospheric), Electric-Arc Spray, Detonation Spray, High Velocity Oxygen Fuel, and High Velocity Air Fuel, among others. For additional background information on thermal spray-coating techniques, reference is made to U.S. Pat. No. 5,268,045, issued to Clare, which is incorporated by reference herein in its entirety.

When employing a thermal spray-coating technique for coating a substrate with neutron-absorbing materials, such as boron carbide, for example, the neutron-absorbing material is provided in the form of small particles that are entrained in an extremely hot gas (typically accompanied by a binder material), with the particles being driven at high velocity and temperature against the surface of the substrate to be coated. As is known, the characteristics of this type of coating technique are such that the small particles of the neutron-absorbing material (and accompanying binder material) adhere to the substrate, thereby forming a tight, hard, physical and mechanical bond with the substrate.

In some embodiments, the neutron-absorbing material may be pre-mixed with a binder material. For instance, boron carbide, for example, may be pre-mixed with nickel, for example, so that small particles of the boron carbide are enveloped by a coating of nickel. The pre-mixed, and now coated, boron carbide may then be entrained in the carrier gas, as described hereinbefore.

In other embodiments, such as other applications involving enamel or other types of hard protective coatings, the neutron-absorbing material may be mixed with a binder material and then applied to a surface of the substrate. The substrate with the neutron-absorbing material applied thereto then may be cured, such as by baking , e.g., baking at high temperatures for prolonged periods. As is known, such baking also may involve exposure to certain gas environments in order to promote proper curing. This process may then be repeated, as required, in order to achieve desired thickness of the coating. It should be noted that the aforementioned baking processes and spray-coating processes may be utilized independently or in combination in order to achieve coatings possessing the desired characteristics.

Thus, the present invention provides storage systems and methods which may promote: structural stability of the neutron-absorbing material so that it does not move or relocate during normal or accident conditions; reduced dilution and increased effectiveness in absorbing neutrons for maintaining safety while reducing costs; resistance to attack (e.g., chemical attack), degradation or oxidation under adverse temperature or ph environments; and reduced space requirements upon, and weight added to, prior art storage systems so as to increase the contents of fissile materials, such as SNF, and reduce the unit fissile material storage and transport costs.

Figure 2:
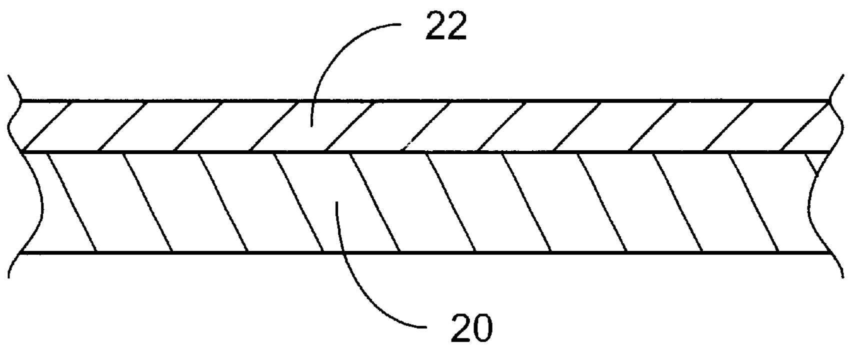
FIG. 2 is a cross-sectional, cut-away view of a representative substrate formed by a preferred embodiment of the present invention.
Figure 3:
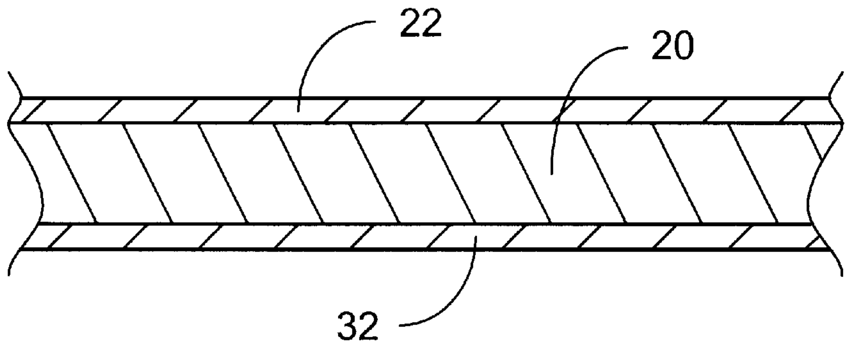
FIG. 3 is a cross-sectional, cut-away view of a representative substrate formed by a preferred embodiment of the present invention.
Figure 4:
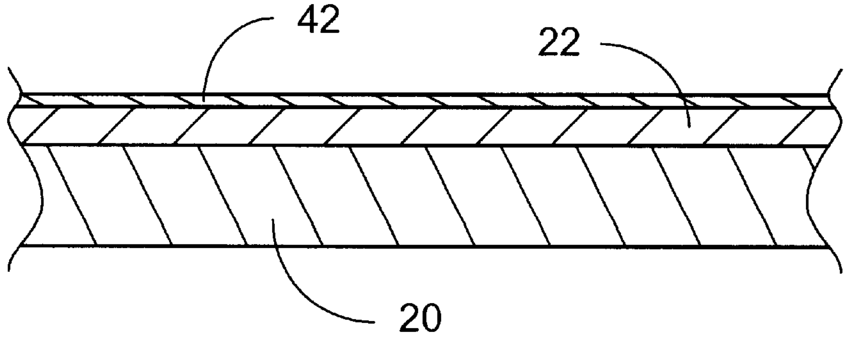
FIG. 4 is a cross-sectional, cut-away view of a representative substrate formed by a preferred embodiment of the present invention.

Referring now to FIGS. 2–4, several coating configurations will now be described in detail. As shown in FIG. 2, substrate 20, such as a wall or other component of a storage container and/or container insert, for example, may be provided with a coating 22 on one or more of its surfaces. Preferably, the coating is applied to an interior surface of such a container so that the coating is appropriately arranged proximate to the fissile material, e.g., SNF, to be stored within the container. Likewise, when applied to a container insert, the coating preferably is applied to an interior surface of such a container insert, although arranging the coating only on an exterior surface of the container insert may be appropriate, as arranging the coating in such a manner may provide the neutron-absorbing material of the coating in appropriate proximity to the fissile material.

As depicted in FIG. 3, substrate 20 also may be provided with a coating 32 so that the substrate 20 is at least partially disposed between the opposing coatings, e.g., coatings 22 and 32.

Referring now to FIG. 4, substrate 20, in addition to being provided with one or more coatings, may include a cladding 42 so that the coating 22 is at least partially disposed between the substrate and the cladding. Such a cladding may be provided by employing a thermal spray-coating technique, as described hereinbefore, by a conventional electroplating technique or by mechanical attachment, e.g., welding. So provided, the cladding, which may be formed of any metal, such as nickel, chromium, iron, copper, aluminum, zirconium, tin, tungsten, or any other suitable material, such as ceramic, for example, may ensure improved survivability of the coating disposed therebelow, as well as improve the affixation of the coating to the substrate by physically wrapping the coating and retaining the coating against the substrate.

The systems and methods of the present invention also may be utilized with, and/or as, neutron-shielding components for storing fissile material. More specifically, in a preferred embodiment, a coating of neutron-absorbing material may be applied to an exterior of a storage container and then a neutron-thermalizing medium, e.g., hydrogenous material such as water, a material having a high hydrogen content, a material having a high light-atom content (a material having an atomic number of approximately 16 or lower), for example, may be arranged in proximity thereto. So provided, the neutron-thermalizing medium and the coating cooperate to form a shielding assembly for the storage container. It should be noted that shielding assemblies formed of neutron-thermalizing media and coatings may be provided in numerous configurations, such as being adapted for use with various storage containers and/or container inserts, on interior and/or exterior surfaces, etc., depending upon the particular application, with all such configurations being considered well within the scope of the present invention.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for storing fissile material, comprising:

a storage container having at least one interior surface defining a storage volume configured to receive the fissile material therein; and a neutron-absorbing coating completely covering said interior surface to provide a continuous neutron-absorbing barrier along said interior surface, said coating being formed, at least in part, of a neutron-absorbing material, wherein said neutron-absorbing coating further completely covers the exterior surface of said storage container to further provide a continuous neutron-absorbing barrier along said exterior surface; and a neutron-thermalizing medium, wherein said storage container is at least partially submerged in said neutron-thermalizing medium so that said neutron-absorbing coating and said neutron-thermalizing medium cooperate to provide a neutron-thermalizing and neutron-absorbing shielding around at least a portion of said storage container, wherein said neutron-thermalizing medium comprises hydrogenous material.

2. The system of claim 1, wherein said neutron-absorbing coating further completely covers the exterior surface of said storage container to further provide a continuous neutron-absorbing barrier along said exterior surface.

3. The system of claim 1, wherein the fissile material is spent nuclear fuel (SNF), and further comprising a protective cladding completely covering said neutron-absorbing coating to protectively shield and reinforce the attachment of said neutron-absorbing coating.

4. The system of claim 1, wherein said neutron-absorbing material is selected from the group consisting of: boron, hafnium, cadmium, gadolinium, silver, cobalt, samarium, iron and indium.

5. The system of claim 1, wherein said coating is a thermal spray-coating.

6. The system of claim 1, wherein said cladding comprises at least one of the group consisting of: metals and ceramics.

7. The system of claim 1, wherein the storage container has a container insert configured to insert therein, said container insert configured to receive the fissile material therein, and wherein said coating entirely covers at least the interior surface of said container insert.

8. The system of claim 1, further comprising:

a cladding covering said coating so that said coating is disposed between said cladding and the surfaces of the storage container.

9. The system of claim 1, further comprising an outer container, wherein said storage container is inserted into said outer container.

10. The system of claim 1, further comprising a protective cladding completely covering the portion of said neutron-absorbing coating that is completely covering said exterior surface of said storage container to protectively shield and reinforce the attachment of said neutron-absorbing coating that is completely covering said exterior surface of said storage container.

11. The system of claim 1, wherein said neutron-absorbing coating comprises multiple layers of coating.

12. A system for storing fissile material, comprising:

a storage container having at least one interior surface defining a storage volume configured to store the fissile material therein;

a neutron-absorbing coating continuously covering at least the portion of said interior surface that surrounds the fissile material to provide a continuous neutron-absorbing barrier around the fissile material, wherein said neutron-absorbing coating further continuously covers at least the portion of the exterior surface of said storage container that is adjacent to the fissile material; and a neutron-thermalizing medium, wherein said storage container is at least partially submerged in said neutron-thermalizing medium so that said neutron-absorbing coating and said neutron-thermalizing medium cooperate to provide a neutron-thermalizing and neutron-absorbing shielding around at least a portion of said storage container.

13. The system of claim 12, wherein said neutron-absorbing coating continuously covers at least 50% of said interior surface.

14. The system of claim 12, Wherein said neutron-absorbing coating continuously covers at least 75% of said interior surface.

15. The system of claim 12, wherein said neutron-absorbing coating continuously covers at least 90% of said interior surface.

16. The system of claim 12, further comprising a protective cladding covering said neutron-absorbing coating to protectively shield and reinforce the attachment of said neutron-absorbing coating.

17. The system of claim 12, further comprising a protective cladding covering the portion of said neutron-absorbing coating that is covering said exterior surface of said storage container to protectively shield and reinforce the attachment that portion of said neutron-absorbing coating.

* * * * *